(12) United States Patent
Troll

(10) Patent No.: US 7,695,801 B2
(45) Date of Patent: *Apr. 13, 2010

(54) OPTICAL SYSTEMS AND REFRACTIVE INDEX-MATCHING COMPOSITIONS

(75) Inventor: Mark Troll, Seattle, WA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1069 days.

This patent is subject to a terminal disclaimer.

(21) Appl. No.: 11/090,551

(22) Filed: Mar. 25, 2005

(65) Prior Publication Data

US 2005/0170146 A1  Aug. 4, 2005

Related U.S. Application Data

(63) Continuation of application No. 10/010,810, filed on Nov. 13, 2001, now Pat. No. 6,890,619.

(51) Int. Cl.
G02B 6/26 (2006.01)
G02B 6/42 (2006.01)
B32B 3/30 (2006.01)
B32B 3/28 (2006.01)

(52) U.S. Cl. .......... 428/156; 428/167; 385/16; 385/17; 385/18

(58) Field of Classification Search ......... 428/156, 428/167, 172; 385/16–18
See application file for complete search history.

(56) References Cited

U.S. PATENT DOCUMENTS 4,988,157 A  1/1991  Jackel et al.
5,166,515 A  11/1992  Attridge
5,382,985 A  1/1995  Becker et al.
5,534,187 A  7/1996  Miyazawa et al.
5,699,462 A  12/1997  Fouquet et al.
5,716,543 A * 2/1998  Schlosser et al. ....... 252/299.63
5,960,131 A  9/1999  Fouquet et al.
6,072,924 A  6/2000  Sato et al.
6,166,125 A * 12/2000  Sugiyama et al. .......... 524/462
6,195,478 B1  2/2001  Fouquet
6,324,316 B1  11/2001  Fouquet et al.
6,377,873 B1  4/2002  Troll
6,532,319 B2  3/2003  Myer et al.
6,890,619 B2 * 5/2005  Troll ...................... 428/156
2002/0048425 A1 * 4/2002  McBride et al. ............. 385/16

* cited by examiner

Primary Examiner—David R Sample
Assistant Examiner—Catherine Simone

(57) ABSTRACT

Optical systems such as, for example, optical switches, are disclosed comprising a solid component and a refractive index-matching liquid composition interfaced with the solid component. The liquid composition has a refractive-index that is substantially equal to that of the solid component. In one approach the liquid composition is a saturated cyclic compound consisting essentially of carbon and hydrogen and optionally oxygen such as, e.g., cyclic alkanes, alcohols or ketones. In another approach the liquid composition is benzene substituted with one or more electron-donating groups attached directly to the ring and one of more fluoro groups attached to the ring or to the electron-donating groups. In yet another approach the liquid composition is a combination comprising one or more of benzene or substituted benzene and optionally at least one of an alkane or substituted alkane having a boiling point less than about 130° C. Also disclosed are methods for preparing a liquid composition having a predetermined refractive index at a predetermined temperature and methods for transmitting optical signals.

14 Claims, 1 Drawing Sheet

OPTICAL SYSTEMS AND REFRACTIVE INDEX-MATCHING COMPOSITIONS

This application is a continuation of U.S. patent application Ser. No. 10/010,810 filed Nov. 13, 2001, now U.S. Pat. No. 6,890,619, the entire disclosure of which is incorporated herein by reference.

BACKGROUND OF THE INVENTION

This invention relates generally to the area of devices having a liquid interfaced with a solid component. In particular, the invention is concerned with optical systems and liquids for refractive index-matching. In one aspect the invention concerns methods for preparing a liquid composition for use in refractive index-matching.

Traditionally, signal exchanges within telecommunications networks and data communications networks have been accomplished by transmitting electrical signals via electrically conductive lines. However, an alternative medium of data exchange is the transmission of optical signals through optical fibers. Since a light beam can be easily generated and modulated so as to carry much more information than is possible with an electrical signal, light beams have a distinct advantage in communicating information between two or more locations. High quality, low loss optical fibers are now readily available so that optical fibers are now being used widely to define optical paths for such light beams. Fiber optical switches may be used to control routing of optical beams along alternative fiber optical paths. Equipment for efficiently generating and transmitting the optical signals has been designed and implemented, and optical switches have been designed for use in telecommunications and data communications networks.

There are many situations in optical systems where a liquid whose refractive index is approximately equal, or equal, to that of a solid component of the optical system, is useful such as, for example, optical switches. Most refractive index data is available for the wavelength 586.26 nanometers (nm), also known as the sodium D line. For a smaller number of materials, information is also available at a limited number of other visible wavelengths such as 706.52 nm, 667.81 nm, 656.28 nm, 546.07 nm, 501.57 nm, 486.13 nm and 435.83 nm. However, there is very little data on the refractive index of liquids in the wavelength ranges relevant to the communications industry, which are typically 1270 to 1350 nm and 1470 to 1620 nm. Techniques of estimation must be used for most compounds, and several commonly used approximations (e.g., Sellmeier equation) are not accurate due to the combined effects of ultraviolet (UV) and infra-red (IR) absorption bands. It is, therefore, not a simple matter of looking up the refractive index of a potential liquid. Experimental determination is also difficult requiring special apparatus.

Preferably, the liquid for refractive index-matching does not have atoms of chlorine, bromine or iodine as certain compounds with these elements are known to deplete the ozone layer of the earth. The liquid preferably does not contain toxic elements such as, for example, lead, tin, mercury, or other heavy metals. However, it is difficult to find compounds that have a low boiling point and sufficiently high refractive index for many applications without resorting to materials that contain chlorine, bromine, iodine, heavy metals, sulfur, selenium, tellurium or arsenic. Without these special refractive index enhancers, the refractive index largely depends on the number of atoms per unit volume. This depends on the number of atoms per molecule and the intermolecular forces that draw the molecules towards each other. However, using materials with increasing numbers of atoms per molecule and/or stronger intermolecular forces invariably increases the boiling point or lowers the vapor pressure.

There remains a need for refractive index matching liquids that have a low boiling point and sufficiently high refractive index for applications in optical systems and other areas where the refractive index of a liquid must match or approximate that of a solid component with which it is interfaced. The liquid should not comprise a material that contains chlorine, bromine, iodine, heavy metals, sulfur (in most cases), selenium, tellurium or arsenic.

SUMMARY OF THE INVENTION

The present invention provides liquids for use in devices where the liquid is interfaced with a solid component of the device. The present liquids have a refractive index that is equal to, or substantially equal to, the refractive index of the solid component. The liquid may be moved with respect to the solid component or vice versa without significant damage to the solid component. The present liquids are stable at the temperatures of use and do not change their optical or physical parameters to any significant degree. The liquids of the invention do not, to any substantial degree, decompose, polymerize, form solid deposits or react with any of the materials with which it will be in contact such as, e.g., components of an optical device, including metals in the presence of light and heat. Furthermore, the liquids have low absorption of light and relatively low toxicity. The present refractive index-matching liquids match well over a range of wavelengths such as, for example, the wavelength ranges of about 1250 to about 1320 nm and about 1470 to about 1600 nm. These wavelength ranges are typically used for optical communications and, accordingly, the present liquids are useful for index-matching in optical communications devices.

For ease of handling and manufacturing, the present liquids do not react appreciably with air nor absorb any component of air such as, e.g., water vapor and carbon dioxide, rapidly enough to cause problems. The interface between a liquid of the invention and a solid component of a device has negligible reflection and refraction, which is beneficial for optical systems. In addition, diffraction effects can be minimized in many cases with the present liquids.

The present invention provides a device comprising a solid component and a liquid composition interfaced therewith. The liquid composition has a refractive-index that is substantially equal to that of the solid component and is selected from the group consisting of (i) saturated cyclic compounds consisting essentially of carbon and hydrogen and optionally oxygen, (ii) benzene substituted with one or more electron-donating groups attached directly to the ring and one or more fluoro groups attached to the ring or to the electron-donating groups, and (iii) a combination comprising one or more of benzene or substituted benzene and optionally at least one of an alkane or substituted alkane having a boiling point less than about 130° C.

The present invention provides an optical system comprising a solid component of an optical system and the aforementioned liquid composition interfaced therewith where the liquid composition has a refractive-index that is substantially equal to that of the solid component.

The present invention provides a method of preparing a liquid composition having a predetermined refractive index at a predetermined temperature. The method comprises combining a first reagent having a refractive index that is higher than the predetermined refractive index at the predetermined temperature and a boiling point that is less than about 100° C.

with a second reagent having a refractive index that is lower than the refractive index of the first reagent and a boiling point of less than about 130° C. The first reagent and the second reagent are combined in amounts effective to obtain the liquid composition having a predetermined refractive index. Optionally, the liquid composition may comprise additional reagents, each having a respective refractive index and boiling point, in an amount sufficient to obtain the liquid composition having a predetermined refractive index at the predetermined temperature.

The present invention provides an optical switch comprising optical waveguides that are formed in a substrate and intersect each other, a cavity having a wall surface at a predetermined angle from the optical axis of the optical waveguide positioned at the intersection of the optical waveguides, and a refractive index-matching liquid in the cavity. The refractive index-matching liquid is one of the aforementioned liquid compositions.

The present invention provides a method for matching the refractive index of a solid component of a device. A solid component of the device is contacted with a liquid composition having a refractive index that is substantially equal to that of the solid component. The liquid composition is selected from the aforementioned groups.

The present invention provides a method for transmitting optical signal. In the method an optical signal is generated and transmitted along a pathway of an optical device. A refractive index-matching liquid selected from the aforementioned groups is moved into and out of intersection with the pathway to control the transmission of the optical signal.

DETAILED DESCRIPTION OF THE INVENTION

Figure 1:
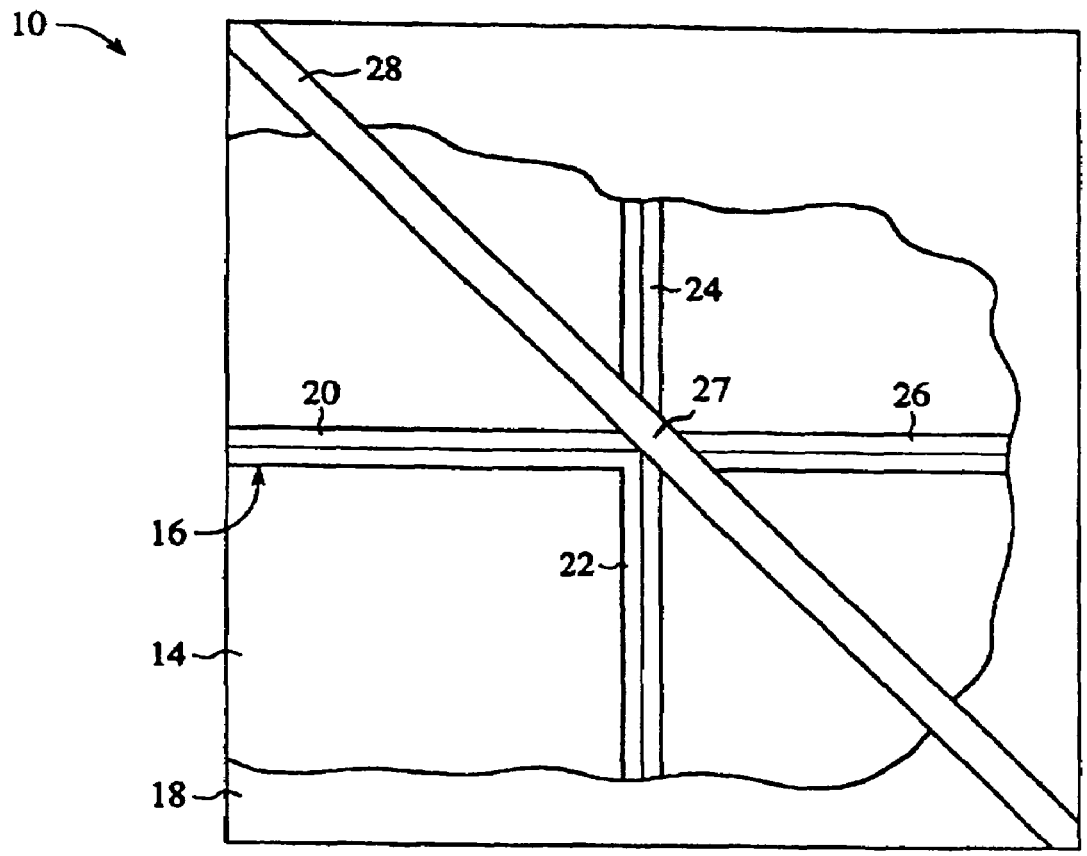
FIG. 1 is a top view of an optical switching element.

As mentioned above, the present invention provides liquids for use in devices where the liquid is interfaced with a solid component of the device. The present liquids have a refractive index that is equal to, or substantially equal to, the refractive index of the solid component. The present refractive index-matching liquids match well over a range of wavelengths such as, for example, the wavelength ranges of about 1250 to about 1320 nm and about 1470 to about 1600 nm. These wavelength ranges are typically used for optical communications and, accordingly, the present liquids are useful for index-matching in optical communications devices.

In one aspect the liquids of the present invention have application to situations where a liquid for refractive index matching must be removed by vaporization, i.e., evaporation or boiling. An example is a waveguide optical cross-connect switch as described by Fouquet, et al., infra. The liquids of the invention have relatively low boiling points and energy requirements to vaporize. The liquids of the invention also exhibit a relatively rapid change of vapor pressure with temperature. The latter characteristic is advantageous in situations when a vapor bubble must be maintained against pressure. The refractive index matching liquids of the invention have a vapor composition that is not substantially different from the liquid composition. Accordingly, changes in the refractive index due to separation processes similar to distillation are avoided in the present invention.

The refractive index matching liquids of the invention may also be used in applications where the matching liquid is exposed to the atmosphere for extended periods. In those situations, a high boiling point or, equivalently, a low vapor pressure, is preferred. This is particularly important for mixtures of liquids where preferential evaporation of one component of a mixture would lead to a change in composition and, therefore, in refractive index.

Examples of devices that comprise a solid component that is interfaced with a refractive index matching liquid of the invention are next discussed by way of illustration and not limitation. As one skilled in the art will appreciate, the invention has application to any device wherein a liquid is interfaced with a solid component and it is desired that the refractive index of the liquid match the refractive index of the solid component.

One type of device to which the present invention may be applied is a device employed in optical systems. For example, optical switches are employed for setting and switching optical paths in optical communication systems and the like. Often, optical paths are switched by changing the conditions of reflection and transmission of light as a result of moving a liquid in a cavity such as, for example, a groove or gap, formed at some point of the optical path. The optical switches often comprise optical waveguides that are formed in a substrate and intersect each other such as by crossing each other, forming a T intersection and so forth. The optical switches also comprise a cavity having a wall surface at a predetermined angle crossed from the optical axis of optical waveguide and positioned at the intersection of the optical waveguides, and a refractive index-matching liquid in the cavity.

The liquid in the cavity may be sealed in the cavity or it may be exposed to the outside. One method proposed for switching optical paths involves pouring a refractive index-matching liquid into a cavity formed in a crossing point of optical waveguides arranged in a lattice pattern. In another method proposed for switching optical paths, bubbles are generated by an electrolytic action to remove a liquid in a cavity. When the bubbles disappear by recombination using catalytic electrodes, liquid refills the cavity. In both of the above methods, the liquid is exposed to the outside. As such, the liquid is subject to evaporation and the like.

As mentioned above, sealed or sealable devices are known. One approach is discussed in U.S. Pat. No. 5,699,462 (Fouquet, et al.), which is discussed in detail below. A switching element defines a transmitting state and a reflecting state for a pair of intersecting waveguides that have a gap at their intersection. The waveguides are part of a sealed system wherein in the transmitting state index-matching liquid fills the gap, enabling light to continue in the original waveguide direction.

In another type of optical switch, movement of liquid to be used for switching optical paths is performed by heating the liquid through a heater arranged near a cavity. In one approach an optical switch comprises an optical waveguide formed on a substrate and a gap in the form of a groove that is formed so as to cross a core of the waveguide. The gap stores a refractive index-matching liquid have the same refractive index as that of the core. A means for regulating the temperature of liquid such as, for example, a thermoelectric cooling element, is arranged in proximity to the gap. This element forcefully heats and vaporizes the liquid in the gap or forcefully cools and condenses the liquid.

As mentioned above, the present invention provides liquid compositions that have refractive indices that are equal to, or substantially equal to, the refractive indices of solid components of optical systems. By the phrase "substantially equal to" is meant that the refractive index is at least within about 0.01 units, preferably, about 0.001 units, of the refractive index of the solid component. Desirably, the refractive index is identical to the refractive index of the solid component.

The liquid compositions comprise primarily three different types. In one embodiment the liquid composition comprises a saturated cyclic compound consisting essentially of carbon and hydrogen and optionally oxygen (Refractive Index Matching Liquid—Type 1). In another embodiment the liquid composition comprises a benzene substituted with one or more electron-donating groups attached directly to the ring and one or more fluoro groups attached to the ring or to the electron-donating groups (Refractive Index Matching Liquid—Type 2). In yet another embodiment the liquid composition is a combination comprising one or more of benzene or substituted benzene and optionally at least one of an alkane or substituted alkane having a boiling point less than about 130° C. (Refractive Index Matching Liquid—Type 3). The aforementioned embodiments will next be discussed in detail.

Refractive Index Matching Liquid—Type 1

As mentioned above, one liquid composition in accordance with the present invention comprises a saturated cyclic compound consisting essentially of carbon and hydrogen and optionally oxygen. By the term "saturated" is meant that the compound does not contain any carbon-carbon double bonds or triple bonds. By the term "cyclic" is meant that the compound comprises one or more rings. Usually, the number of rings is 1 to about 4, more usually, 1 to 2. For the most part the atoms of the rings are carbon atoms. However, it is within the purview of the invention that one or more of the atoms may be oxygen or nitrogen. The number of each of the aforementioned atoms in the saturated cyclic compound is dependent on the number of rings, the nature of the atoms present, and the desired refractive index of the liquid composition. The number of atoms of carbon in the saturated cyclic compound is about 4 to about 100, usually, about 5 to about 60, more usually, about 5 to about 12. Lower number of atoms in the compound usually relates to a lower boiling point. For a compound that has only one ring, the number of carbon atoms in the ring is usually about 4 to about 20, more usually about 5 to about 16. In this embodiment the saturated cyclic compound may be, for example, a saturated monocyclic hydrocarbon such as cyclobutane, cyclopentane, cyclohexane, cycloheptane, cyclooctane, cyclononane, cyclodecane, cyclohexadecane, and the like.

When more than one ring is present, the rings may be fused rings or spiro rings. In this embodiment the saturated cyclic compound may be, for example, a saturated fused ring or spiro ring hydrocarbon such as bicyclohexane, bicycloheptane, bicyclooctane, bicyclononane, adamantane, decahydronaphthalene, and the like and including the isomeric forms thereof such as cis and trans isomers where appropriate.

On the other hand, where more than one ring is present, the rings may be connected to one another through a bond or a linking group. In a sense the ring is substituted with a substituent that comprises another ring linked to the first ring by a bond or a linking group. The nature of the linking group is in keeping with the saturated nature of the aforementioned liquid compositions. Accordingly, the linking group is usually an alkylene chain. "Alkylene" means a branched or unbranched saturated divalent hydrocarbon radical containing 1 to 30 or more carbon atoms, such as methylene, ethylene, propylene, 2-methylpropylene, 1,2-dimethylpropylene, pentylene, and the like. It is within the scope of the present invention that the linking group may comprise 1 to about 10 oxygen atoms usually in the form of an alcohol or keto functionality.

The number of hydrogen atoms present is dependent on the number of carbon atoms and, optionally, the number of oxygen atoms, in the saturated cyclic compound. As a general rule, the number of hydrogen atoms is that necessary to satisfy the valencies of carbon and optionally oxygen atoms present in the saturated cyclic compound.

As may be seen from the above discussion, the saturated cyclic compound may be unsubstituted, thus comprising no substituents on the ring or rings. On the other hand, it may be substituted; that is, it may comprise one or more substituents on the ring or rings of the cyclic compound. Substituted generally means that a hydrogen atom of the saturated cyclic compound has been replaced by another atom. In accordance with the invention the substituents usually consist essentially of carbon and hydrogen and optionally oxygen. Oxygen is normally present as an alcohol or a ketone functionality. The substituents may be alkyl, alkoxy, hydroxy, keto, or alkyl or alkoxy substituted with one or more substituents such as hydroxy, keto, alkoxy and the like. By the term "alkyl" is meant a branched or unbranched saturated monovalent hydrocarbon radical containing 1 to 30 or more carbon atoms, such as methyl, ethyl, propyl, butyl, pentyl, hexyl, heptyl, octyl, nonyl, decyl, undecyl, dodecyl, and so forth, and including the normal, secondary, tertiary, and the like, forms thereof. The number of alkyl substituents may be 1 to about 10, usually, 1 to about 3. The number of hydroxy substituents may be 1 to about 5, usually, 1 to about 3. The number of keto substituents is usually about 1 to about 3, usually, 1 to 2.

The saturated cyclic compound in accordance with this embodiment of the invention usually has a refractive index of about 1.40 to about 1.49, usually, about 1.44 to about 1.475, at 586.26 nanometers (nm). The melting point of the saturated cyclic compound is usually below about 30° C., in some instances below about 15° C., and in other instances below about 0° C.

The refractive index of a material is defined as the ratio of the speed of light in a vacuum to the speed of light in the material. However, when light travels in an optical fiber or waveguide, the light travels through both the core and the cladding, which have different refractive indices. The distribution of light intensity in the guided medium depends on the mode of the light. In general, a guided medium has a number of modes, but a commonly used type of fiber is manufactured so as to allow only one mode (single-mode fiber). The effective refractive index of a particular mode of a guided medium is a function of the geometry of the medium (shape, dimensions) and the refractive indices of the core and cladding regions. It should be noted that the "index" of a fiber or waveguide is frequently determined by the length of time a short pulse of light requires to travel through a known distance of the material. This is referred to as the group index, which concerns the rate of a collection of different wavelengths of light forming a pulse. It is not the phase index, which is relevant for a single wavelength's phase speed. It is the phase index that must be matched to prevent reflection at an interface of two materials.

The relation between the group index, N, and the phase index, n, is:

$$N = n - \lambda dn/d\lambda.$$

wherein $\lambda$ is wavelength of the light. The quantity that must be matched to prevent reflection at an interface is, therefore, the effective phase index of the guided medium (waveguide), either measured experimentally or calculated from the geometry and material constants of the guided medium. For rectangular silica waveguides, 8 μm by 16 μm, this index at 1550 nm is approximately 1.4475, where bulk silica has a refractive index of 1.4402.

The above liquid compounds are normally comprised of a single chemical entity and, therefore, have the advantage of not changing their respective refractive index due to evaporation or other processes that might change the composition of a mixture. In addition, the purity of the above compounds may be checked easily by measuring their index of refraction at the sodium D line by conventional means such as, for example, using an Abbe refractometer.

In one embodiment of this aspect of the invention, the liquid composition is a cycloalkane that is unsubstituted or substituted with alkyl, cycloalkyl, hydroxy, keto, alkyl or cycloalkyl substituted with hydroxy or keto, fused cycloalkyl, fused cycloalkyl substituted with hydroxy or keto, spiro cycloalkyl, spiro cycloalkyl substituted with hydroxy or keto.

Examples, by way of illustration and not limitation, of suitable saturated cyclic compounds in accordance with the present invention are set forth in Table 1.

TABLE 1

| | $n_D^{20}$ |
|---|---|
| Saturated Hydrocarbons, one ring: | |
| Cycloheptane | 1.4455 |
| t-Butylcyclohexane | 1.4470 |
| 1,1,2-trimethylcycloheptane | 1.4527 |
| Butylcyclooctane | 1.4585 |
| Cyclooctane | 1.4586 |
| Cyclononane | 1.4666 |
| Cyclodecane | 1.4716 |
| Cyclohexadecane | 1.4730 |
| Saturated Hydrocarbons, two rings: | |
| Cyclopentylcyclohexane | 1.4725 |
| 1,1-Dicyclohexylbutane | 1.4750 |
| Dicyclohexylmethane | 1.4752 |
| 1,3-Dicyclohexyl-2-Methypropane | 1.4756 |
| 1,3-Dicyclohexylpropane | 1.4756 |
| Bicyclohexyl | 1.4766 |
| 1,2-Dicyclohexylpropane | 1.4790 |
| 1,1-Dicyclohexylpropane | 1.4860 |
| 1,1-Dicyclohexylethane | 1.4887 |
| 2,2-Dicyclohexylpropane | 1.4910 |
| Saturated Hydrocarbons, fused or spiro rings: | |
| Bicyclo[3.2.0]Heptane, cis | 1.4532 |
| Bicyclo[4.1.0]Heptane, cis | 1.4564 |
| Spiro[3.5]Nonane | 1.4581 |
| Bicyclo[4.2.0]Octane, cis | 1.4613 |
| Bicyclo[3.3.0]Octane, trans | 1.4625 |
| Bicyclo[3.3.0]Octane, cis | 1.4629 |
| Bicyclo[4.3.0]nonane, trans | 1.4643 |
| trans-decahydronaphthalene (Bicyclo[4.4.0]decane) | 1.4697 |
| Bicyclo[4.3.0]nonane, cis | 1.4714 |
| 1,3 Dimethyl adamantane | 1.4780 |
| cis-decahydronaphthalene (Bicyclo[4.4.0]decane) | 1.4811 |
| Alcohol derivatives: | |
| Cyclopentanol | 1.4520 |
| 4-methylcycloheptanol | 1.4574 |
| Cyclopentylethanol | 1.4577 |
| Cyclopentylmethanol | 1.4580 |
| 1-Methylcyclohexanol | 1.4585 |
| 2,6-Diethylcyclohexanol | 1.4600 |
| Menthol (l)(2-isopropyl-5-methylcyclohexanol) | 1.4600 |
| trans-2-Methylcyclohexanol | 1.4610 |
| cis-4-Methyl cyclohexanol | 1.4610 |
| (1 S,2S,5R)-(+)-Neomenthol | 1.4610 |
| Menthol (dl)(2-isopropyl-5-methylcyclohexanol) | 1.4615 |
| 3,4-Dimethylcyclohexanol | 1.4620 |
| 4-Ethylcyclohexanol | 1.4625 |
| 4-propylcyclohexanol, cis | 1.4632 |
| 2-Ethylcyclohexanol | 1.4640 |

TABLE 1-continued

| | $n_D^{20}$ |
|---|---|
| Cyclohexane methanol | 1.4644 |
| cis-2-Ethylcyclohexanol | 1.4646 |
| 2-Cyclohexylethanol | 1.4647 |
| (±)-cis-2-Methylcyclohexanol | 1.4650 |
| (±)-1-Cyclohexane ethanol | 1.4650 |
| 2,3-Dimethylcyclohexanol | 1.4650 |
| Cyclohexane methanol | 1.4650 |
| Cyclohexanol | 1.4650 |
| 2,3-Dimethylcyclohexanol | 1.4653 |
| (±)-cis-2-Methylcyclohexanol | 1.4655 |
| α-methylcyclohexylmethanol | 1.4656 |
| 3-Cyclohexyl-1-propanol | 1.4660 |
| 4-Cyclohexyl-1-butanol | 1.4660 |
| cis-2-Isopropylcyclohexanol | 1.4665 |
| Dihydroterpineol | 1.4670 |
| cis-4-Isopropylcyclohexanol | 1.4671 |
| 1-methylcycloheptanol, | 1.4677 |
| 1,2,2-trimethylcyclohexanol, | 1.4680 |
| 1,2,2-Trimethylcyclohexanol | 1.4680 |
| 1-(1-Methylethyl)cyclohexanol | 1.4683 |
| cis-2-methylcyclohexylmethanol | 1.4689 |
| 2-methylcycloheptanol | 1.4710 |
| Cycloheptylmethanol | 1.4740 |
| cis-3-Methylcyclohexanol | 1.4752 |
| Cycloheptanol | 1.4760 |
| Cyclooctanol | 1.4860 |
| [1,1'-Bicyclopentyl]-2-ol | 1.4880 |
| Cyclododecylmethanol | 1.4910 |
| 1,3-Cyclohexyldimethanol | 1.4912 |
| 1,3-Dimorphoyl-2-propanol | 1.4980 |
| Ketone derivatives: | |
| 2-Methylcyclohexanone | 1.4480 |
| Menthone(l) | 1.4498 |
| 4-Ethylcyclohexanone | 1.4520 |
| 2-t-Butylcyclohexanone | 1.4570 |
| Cycloheptanone | 1.4608 |
| 4-(1,1-dimethylpropyl)cyclohexanone | 1.4677 |
| Cyclooctanone | 1.4694 |
| Cyclononanone | 1.4725 |
| Octahydro-2H-inden-2-one | 1.4755 |
| [1,1'-bicyclopentyl]-2-one | 1.4763 |
| 6,6 methyl-(1 R)di-bicyclo[3.1.1]heptan-2-one | 1.4787 |
| Cyclodecanone | 1.4806 |
| [1,1'-bicyclohexyl]-2-one | 1.4902 |

Refractive Index Matching Liquid—Type 2

As mentioned above, another embodiment of a liquid composition of the invention that has refractive indices that are equal to, or substantially equal to, the refractive indices of solid components of optical systems comprises a substituted benzene, usually a fluorinated benzene, which optionally may comprise an electron-donating group. These compounds usually have a refractive index of about 1.46 to about 1.49 at 586.26 nanometers (nm). The melting point of these compounds is usually below about 5° C., in some instances below about 20° C., and in other instances below about 30° C. The number of fluoro (derived from fluorine) groups on the benzene or on an electron-donating group and the number of electron-donating groups in general are selected to achieve a refractive index for the resulting substituted benzene in the aforementioned range. The above liquid compounds are normally comprised of a single chemical entity and, therefore, have the advantage of not changing their respective refractive index due to evaporation or other processes that might change the composition of a mixture.

The substituted benzene compounds of this aspect of the invention include one or more, usually, 1 to about 5, more usually, 1 to about 3, fluoro groups attached to the ring of the benzene or to electron-donating groups, which may be substituted on the benzene ring. In general, the benzene is substituted with one or more, usually, 1 to about 2, electron-donating groups attached directly to the benzene ring. The electron-donating group is usually a substituent which, when bound to the benzene, is capable of polarizing the molecule such that the electron-donating group becomes electron poor and positively charged relative to another portion of the molecule, i.e., has reduced electron density. Such groups include, by way of illustration and not limitation, alkyl, alkoxy, hydroxy, amino (with the proviso that the compound be liquid) and the like. By the term "alkoxy" is meant a moiety that comprises an alkyl group-linked to oxygen, which is attached to the benzene ring. Alkoxy includes, for example, methoxy, ethoxy, propoxy, butoxy, pentoxy, hexoxy, heptoxy, octoxy, nonoxy, decoxy, undecoxy, dodecoxy, and so forth, and including the normal, secondary, tertiary, and the like, forms thereof.

Examples, by way of illustration and not limitation, of suitable substituted benzene compounds in accordance with the present invention are set forth in Table 2.

TABLE 2

| Substituted benzene: | $n_D^{20}$ |
|---|---|
| 3-(Trifluoromethyl)benzyl alcohol | 1.4600 |
| α-(Trifluoromethyl)benzyl alcohol | 1.4610 |
| 3-(Trifluoromethyl)phenethyl alcohol | 1.4630 |
| 3,5-Difluoroanisole | 1.4660 |
| Fluorobenzene | 1.4677 |
| 2-(Trifluoromethyl)benzyl alcohol | 1.4680 |
| 3,4-Difluoroanisole | 1.4689 |
| 3-Fluorotoluene | 1.4691 |
| 4-Fluorotoluene | 1.4692 |
| 2-(Trifluoromethyl) phenethyl alcohol | 1.4700 |
| 2-Fluorotoluene | 1.4704 |
| 2,4-Difluoroanisole | 1.4705 |
| 2',4',5'-Trifluoroacetophenone | 1.4720 |
| 2-Fluoro-m-xylene | 1.4790 |
| 2-Fluoro-1,3,5-Trimethylbenzene | 1.4809 |
| 4-Fluorophenetole | 1.4826 |
| 3-Fluoro-o-xylene | 1.4860 |

Refractive Index Matching Liquid—Type 3

In another embodiment of a liquid composition for refractive index matching, the liquid composition is a combination comprising one or more of benzene or substituted benzene or thiophene or substituted thiophene and optionally at least one of an alkane or substituted alkane having a boiling point less than about 130° C. The weight percent of benzene or substituted benzene or thiophene or substituted thiophene in the combination is about 10% to about 95%, usually, about 30% to about 90%. The weight percent is dependent on the refractive indices and boiling points of the benzene or substituted benzene or thiophene or substituted thiophene and the alkane or substituted alkane in the combination. The liquid composition in accordance with this embodiment of the invention usually has a refractive index of about 1.49 to about 1.60 at 586.26 nanometers (nm).

Accordingly, in one aspect of the invention a liquid composition is prepared having a predetermined refractive index at a predetermined temperature. The method comprises combining a first reagent, for example, a benzene or thiophene, with a second reagent, for example, a substituted benzene (or benzene where the first reagent is not benzene) or an alkane or substituted alkane. The first reagent has a refractive index that is higher than the predetermined refractive index at the predetermined temperature and a boiling point that is less than about 100° C., usually, less than about 85° C. The second reagent has a refractive index that is lower than the refractive index of the first reagent and a boiling point of less than about 130° C., usually, less than about 85° C. The first reagent and the second reagent are combined in amounts effective to obtain a liquid composition having a predetermined refractive index. Usually, these amounts are obtained empirically. For example, the first reagent may be benzene or substituted benzene and the second reagent may be benzene or substituted benzene or an alkane or substituted alkane and the predetermined refractive index may be in the range set forth above. In another example, the first reagent may be thiophene or substituted thiophene and the second reagent may be an alkane or substituted alkane and the predetermined refractive index may be in the range set forth above. It should be noted that, although thiophene does contain a sulfur atom, thiophene is acceptable in the present compositions because its odor is not offensive and its toxicity is relatively low.

It is within the purview of the present invention to include in the above composition additional reagents, each having a known refractive index and a boiling point, in an amount sufficient to obtain the liquid composition having a predetermined refractive index. Such additional reagents may be the aforementioned benzene or substituted benzene or alkane or substituted alkane. Again, the amounts of the additional reagents are determined empirically.

As mentioned above, the benzene may be unsubstituted or substituted with one or more alkyl groups, fluoro groups, fluoroalkyl groups, alkoxy groups, and the like. The alkyl groups comprise about 1 to about 20 carbon atoms. The number of fluoro groups on the benzene, and/or the fluoroalkyl group, is usually 1 to about 6, more usually, 1 to about 3. In general, the number of fluoro groups is sufficient to achieve a predetermined refractive index and boiling point. Examples of substituted benzenes include, by way of example and not limitation, toluene, xylene, ethylbenzene, diethylbenzene, propylbenzene, dipropylbenzene, and so forth, including the ortho, meta and para forms thereof where appropriate. The substituted benzenes also include fluorinated derivatives of the above. Examples of fluorinated derivatives, by way of illustration and not limitation, include fluorobenzene, difluorobenzene, trifuorobenzene, tetrafluorobenzene, pentafluorobenzene, hexafluorobenzene, fluorotoluene, difluorotoluene, trifluoromethyltoluene, tetrafluorotoluene, and pentafluorotoluene, and the like.

The alkane of the combination is straight chain, branched chain, or cyclic alkane or a combination thereof. The alkane usually comprises 1 to about 30 carbon atoms, more usually, about 1 to about 8 carbon atoms. The alkane may be unsubstituted or substituted with one or more substituents, usually 1 to about 3 substituents, which may be individually selected. The substituents may be a hydroxy group, an oxo group (double bond to oxygen), a keto group (C=O), alkoxy group, and the like. The number of substituents is generally sufficient to achieve a predetermined refractive index and boiling point for the alkane. Particular examples of alkanes in accordance with this aspect of the invention include, by way of illustration and not limitation, cyclohexane, cyclopentane, hexane, pentane, butane, propane, neopentane, methylbutane, methylpropane, methanol, ethanol, 2-propanol, 1-propanol, 2-butanol, 2-methyl-2-propanol, 2-methyl-1-propanol, acetone, butanone, cyclohexanone, cyclopentanone, and the like.

Examples of liquid compositions in accordance with this aspect of the invention, by way of illustration and not limitation, are set forth in Table 3.

TABLE 3

| Composition | Weight % |
| --- | --- |
| Benzene/cyclohexane | 80-85/15-20 |
| Benzene/cyclopentane | 80-85/15-20 |
| Benzene/hexane | 85-90/10-15 |
| Toluene/cyclopentane | 80-85/15-20 |
| Toluene/fluorobenzene | 45-50/50-55 |
| Thiophene/cyclohexane | 60-65/35-40 |
| Benzene/hexafluorobenzene | 40-55/45-60 |
| Benzene/fluorobenzene | 45-50/50-55 |

The liquid compositions of this aspect of the invention have relatively stable refractive indices and relatively low boiling points. The compositions are stable to thermal or other decomposition and do not polymerize to any appreciable extent under the conditions of use. The compositions have a rate of change of refractive index with wavelength in the 1500 nm region that is close to that of silica.

One aspect of the present invention involves a method for transmitting optical signals. As mentioned above, signal exchanges within telecommunications networks and data communications networks may be accomplished optically. In this regard, data exchange may be carried out by the transmission of optical signals through, for example, optical fibers. Optical switches have been designed for use in telecommunications and data communications networks. In the present methods optical signals are generated by, for example, diode lasers, erbium-doped amplifiers, and the like. The generated optical signals are transmitted along a pathway of an optical device such as, for example, an optical fiber, an optical waveguide, an optical switch, and so forth. The pathway contains a refractive index-matching liquid wherein the refractive index-matching liquid is a liquid composition as discussed above.

In the present invention the aforementioned liquid composition is interfaced with a solid component of a device. As mentioned above, the present refractive index matching liquid compositions may be employed in a wide variety of devices wherein a refractive index matching liquid is employed. These devices include, by way of illustration and not limitation, optical fibers, optical waveguides, bubble in trench devices, thermal capillary switches, thermal optical waveguides, optical gate switches, optical windows, and the like. Typically, the devices comprise a solid component that in turn comprises a material such as, for example, silicon dioxide (silica), silicon dioxide with various additives often referred to as glasses, and the like or any of the above in combination with one another or with various layers such as, for example, oxide layers, polymer layers, and the like. A common feature among the devices is a solid component that is in contact with or interfaced with a liquid composition. It should be noted that the aforementioned ranges for refractive indices are primarily directed to solid components that comprise silicon dioxide and/or silicon dioxide with various additives. Where other solid components are employed such as, for example, silicon, the aforementioned ranges may require adjustment based on the refractive index matching requirements of the solid component.

The following specific devices are discussed next by way of illustration and not limitation.

Figure 2:
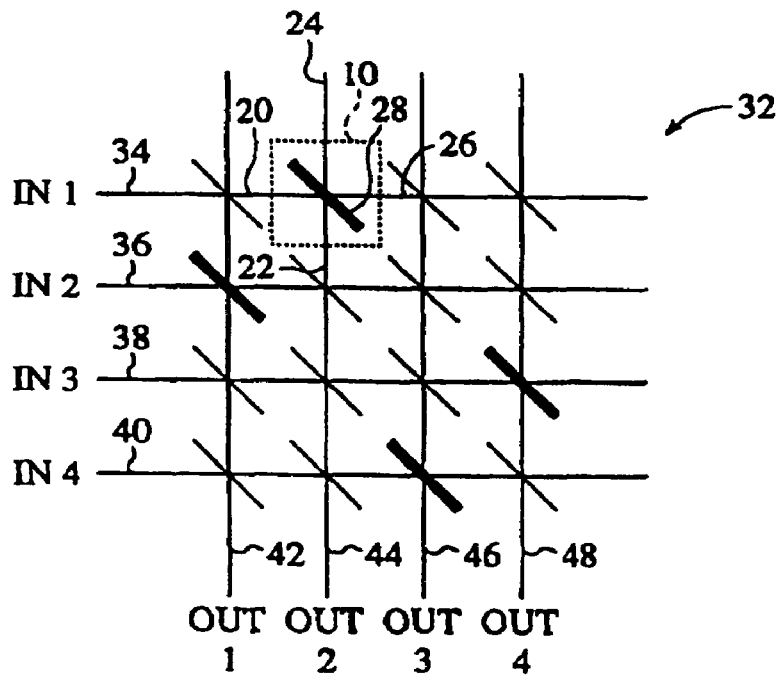
FIG. 2 is a matrix of switching elements of FIG. 1.

One example of a device is that depicted in FIGS. 1 and 2. A switching element 10 is shown In FIG. 1, while a 4×4 matrix 32 of switching elements is shown in FIG. 2. The optical switch of FIG. 1 is formed on a substrate, which may be a silicon substrate or other suitable material as discussed above. Optical switch 10 includes planar waveguides defined by a lower cladding layer 14, a core 16 and an upper cladding layer 18. The core is primarily silicon dioxide, but may comprise other materials that affect the index of refraction of the core. The cladding layers are usually formed of a material having a refractive index that is substantially different from the refractive index of the core material so that optical signals are guided along the core material.

The core material 16 is patterned to divide an input waveguide 20 and an output waveguide 26 of a first waveguide path and to define an input waveguide 24 and an output waveguide 22 of a second waveguide path. A trench 28 is etched through the core material to the silicon substrate. The waveguides intersect the trench at an angle of incidence greater than the critical angle of total internal reflection (TIR) when the trench is filled with vapor or gas. Thus, TIR diverts light from the input waveguide 20 to the output waveguide 22 unless an index-matching material is located within the gap between the aligned segments 20 and 26. Ideally, trench 28 is positioned with respect to the four waveguides such that one sidewall of the trench passes directly through the intersection of the axis of the waveguides. In the 4×4 matrix 32 of FIG. 2, any one of four input waveguides 34, 36, 38 and 40 may be optically coupled to any one of four output waveguides 42, 44, 46 and 48. The switching arrangement is referred to as "non-blocking" since any free input fiber can be connected to any free output fiber regardless of what connections have already been made through the switching arrangement. Each of the sixteen optical switches has a trench that causes TIR in the absence of an index-matching liquid, but collinear segments of a particular waveguide path are optically coupled when the gaps between the collinear segments are filled with an index-matching fluid. Trenches in which the waveguide gaps are filled with fluid are represented by fine lines that extend at an angle through the intersections of optical waveguides in the array. On the other hand, trenches in which there is an absence of index-matching fluid at the gaps are represented by broad lines through a point of intersection.

The input waveguide 20 of FIGS. 1 and 2 is in optical communication with the output waveguide 22 as a result of reflection at the empty trench 28. Since all other cross points for allowing the input waveguide 34 to communicate with the output waveguide 44 are in a transmissive state, a signal that is generated at input waveguide 34 will be received at output waveguide 44. In like manner, input waveguide 36 is optically coupled to the first output waveguide 42, the third input waveguide 38 is optically coupled to the fourth output waveguide 48, and the fourth input waveguide 40 is coupled to the third output waveguide 46.

In accordance with the present invention the aforementioned liquid compositions, i.e., Refractive Index-matching Liquids Type 1, Type 2 or Type 3, may be employed as the refractive index-matching fluid of the devices of FIGS. 1 and 2. The liquid compositions of the invention may be employed in the gap located between the aligned segments 20 and 26 of the devices of FIGS. 1 and 2.

Another device to which the present invention has application is that described in U.S. Pat. No. 5,699,462 (Fouquet, et al.). A switching element defines a transmitting state and a reflecting state for a pair of intersecting waveguides that have a gap at their intersection. In the preferred embodiment, the switching element exhibits total internal reflection at the gap sidewall from one waveguide to the other when not in the transmitting state. In the transmitting state, index-matching liquid fills the gap, enabling light to continue in the original waveguide direction. The switching element may use inkjet techniques or bubble techniques to displace index-matching liquid. The index-matching fluid may be projected from a gap between the waveguides by a jet mechanism; or a vapor or dissolved gas bubble may be formed to fill the gap between the waveguides to provide the reflecting state for the switching element. Using either of these techniques, heaters are employed to initiate the switching operation.

U.S. Pat. No. 6,195,478 B1 (Fouquet) discloses a planar light wave circuit-based optical switch using micromirrors in trenches. A planar light wave circuit is formed to include switching elements in which optical coupling among waveguides is determined by positions of a displaceable member, such as micromirrors. Each switching element includes at least two light-transmitting waveguides extending along a waveguide substrate to a trench. The optical coupling between the waveguides of a switching element is dependent upon the optical characteristics exhibited at the trench. The displaceable device of a switching element has a transmitting position and a reflecting position. The displaceable device may be manipulated using microelectromechanical system techniques or techniques similar to those used in a dot matrix printer engine. The trench at the crosspoint of waveguides may include a liquid having a refractive index that closely matches the refractive index of the core material of the waveguides. The present liquid compositions of the types described above may be employed in this device.

The liquids of the present invention may be used in devices that represent changes to the device shown in FIGS. 1 and 2. For example, Jackel, et al. (U.S. Pat. No. 4,988,157), disclose an embodiment of a device Wherein water or a refractive index-matching liquid resides within the gap between waveguides until an electrochemically generated bubble is formed. A pair of electrodes is positioned to electrolytically convert the liquid to gaseous bubbles. A bubble at the gap between collinear waveguides creates an index mismatch and causes light to be reflected at the sidewall of a trench. The bubble can be destroyed by a second pulse of appropriate polarity, thereby removing the bubble and returning the switch to the transmissive state.

Jackel (U.S. Pat. No. 4,988,157) discloses an optical switch using bubbles. Parallel input waveguides and parallel output waveguides are formed on a substrate at perpendicular angles so as to intersect. A 45 degree slot is formed across each intersection and is filled with a fluid having a refractive index matching the waveguide material. Electrodes are positioned adjacent the slots and are selectively activated to electrolytically convert the fluid to gaseous bubbles, thereby destroying the index matching across the slot and causing light to be reflected by the slot rather than propagating across the slot. In the presence of a catalyst, a pulse of opposite polarity of sufficient size and of he same polarity destroys the bubble. The liquid compositions described above may be employed in such a device as the refractive index-matching liquid.

Another embodiment of a device is disclosed in Japanese patent application No. 6-229802 (Sato, et al.) (Kokai No. 8-94866). In this embodiment heaters are employed to supply and remove index-matching liquid to and from a gap that is intersected by two waveguides. Flow of liquid is controlled by selectively activating heater elements. The present refractive index-matching liquids may be employed as the refractive index-matching liquid used in the Sato embodiment.

A switch element having an expanding waveguide core is disclosed in U.S. Pat. No. 5,960,131 (Fouquet, et al.). The device comprises a switching element that selectively couples a first optical path to a second optical path through an index-matching fluid. The switching element includes a tapering region along each of the optical paths to achieve high coupling efficiency at both ends of substrate waveguides that form portions of the two optical paths. The two substrate waveguides are separated by a gap that is filled with the index-matching fluid in order to optically couple the two waveguides. In accordance with the present invention the aforementioned liquid compositions, i.e., Refractive Index-matching Liquids Type 1, Type 2 or Type 3, may be employed as the refractive index-matching fluid of the Fouquet device.

Another device in which the present liquid compositions may be utilized is disclosed by Sato, et al., in U.S. Pat. No. 6,072,924. Sato discloses an optical switch that includes a substrate having therein optical waveguides made of silicon and a silicon layer deposited on its top surface. A space is formed in the crossing portion of the optical waveguides, which is covered with a lid. Preferably, a groove is formed in a surface of the optical waveguide substrate or a bonding surface of the lid. After the lid has been bonded, the groove makes a passage that communicates between the space and an outside. The passage is a pouring slit for pouring an index-matching liquid and is connected to the space, which acts as a driving slit in which the index-matching liquid moves.

EXAMPLES

The invention is demonstrated further by the following illustrative examples. Parts and percentages are by weight unless otherwise indicated. Temperatures are in degrees Centigrade (° C.) unless otherwise specified. The following preparations and examples illustrate the invention but are not intended to limit its scope.

Test Device

A test device similar to that described in U.S. Pat. No. 5,699,462 (Fouquet, et al.) and U.S. Pat. No. 6,195,478 B1 (Fouquet) was constructed from a silicon heater chip, a glass waveguide chip, and optical fibers. The device had four waveguides, which crossed four additional waveguides to form an optical crossbar switch. The device was evacuated with a vacuum pump, and a degassed sample of the test liquid was introduced. After filling, entry pipes to the device were closed with a valve. Pressure inside the device was controlled by adjusting the temperature of a chamber connected to the interior of the device, which was also partially filled with the liquid at the time of the initial introduction of liquid into the device.

Diode lasers were used to introduce 1550 nm light into the fibers connected to the device. The output from the device was monitored at both the reflecting and transmitting ("out" and "drop") ports by photodiodes. A digitizing oscilloscope was used to record the electronic signals from these diodes.

Example 1

Single Component: Cyclohexane

Cyclohexane was introduced into the device as described above. Heaters were 60×11 µm. For a device temperature of 45° C. and pressure chamber at 55° C., 80 mw was required to be applied to the heater to achieve reflection. Transition times were about 0.5 millisecond.

Example 2

Mixture: Benzene and Cyclohexane

A mixture of 85% benzene and 15% cyclohexane (by weight) was prepared and introduced in to the device as described above. Heaters were 60×11 μm. For a device temperature of 45° C. and pressure chamber at 55° C., 78 mw was required to achieve reflection. Transition times were about 0.5 millisecond.

Example 3

Mixture: Benzene and Fluorobenzene

A mixture of 45% benzene and 55% fluorobenzene (by weight) was prepared and introduced in to the device as described above. Heaters were 60×11 μm; for a device temperature of 45° C. and pressure chamber at 55° C., 80 mw was required to achieve reflection. Transition times were about 0.5 millisecond.

Example 4

Mixture: Thiophene and Cyclohexane

A mixture of 61.5% benzene and 38.5% cyclohexane (by weight) was prepared and introduced in to the device as described above. Heaters were 60×11 μm; for a device temperature of 45° C. and pressure chamber at 55° C., 80 mw was required to achieve reflection. Transition times were about 0.5 millisecond.

Example 5

Mixture: Benzene and Cyclopentane

A mixture of 83% benzene and 17% cyclopentane (by weight) was prepared and introduced in to the device as described above. Heaters were 60×11 μm; for a device temperature of 45° C. and pressure chamber at 55° C., 80 mw was required to achieve reflection. Transition times were about 0.5 millisecond All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A device comprising:
   (a) a solid component and
   (b) a liquid composition interfaced therewith, said liquid composition having a refractive-index that is substantially equal to that of said solid component, said liquid composition comprising a fluorinated benzene or a combination of benzene and a fluorinated benzene.

2. A device according to claim 1 wherein said liquid composition comprises a combination of benzene and a fluorinated benzene substituted with one to 6 fluoro groups attached to the ring.

3. A device according to claim 1 wherein said fluorinated benzene is selected from the group consisting of fluorobenzene, difluorobenzene, trifluorobenzene, tetrafluorobenzene, pentafluorobenzene, hexafluorobenzene, fluorotoluene, difluorotoluene, trifluoromethyltoluene, tetrafluorotoluene, and pentafluorotoluene.

4. A device according to claim 1 wherein said fluorinated benzene is fluorobenzene, 1,3-difluorobenzene, 1,3,5-trifluorobenzene, hexafluorobenzene, 2-fluorotoluene, 3-fluorotoluene or 4-fluorotoluene.

5. A device comprising the device of claim 1 wherein said device comprises a groove in a substrate.

6. An optical system comprising:
   (a) a device according to claim 1, said solid component comprising a cavity and an optical path comprising first and second segments separated by said cavity, and
   (b) control means for selectively causing said liquid composition to be disposed in said cavity between said first and second segments.

7. An optical system according to claim 6 wherein said fluorinated benzene is selected from the group consisting of fluorobenzene, difluorobenzene, trifuorobenzene, tetrafluorobenzene, pentafluorobenzene, hexafluorobenzene, fluorotoluene, difluorotoluene, trifluoromethyltoluene, tetrafluorotoluene, and pentafluorotoluene.

8. An optical system according to claim 6 wherein said solid component comprises silica.

9. An optical system according to claim 6 wherein said solid component is a substrate comprising a groove, said substrate being a component of an optical switch.

10. An optical switch comprising:
    (a) optical waveguides that are formed in a substrate and intersect each other,
    (b) a cavity having a wall surface at a predetermined angle from the optical axis of the optical waveguide and positioned at the intersection of the optical waveguides, and
    (c) a refractive index-matching liquid disposed for selective introduction into said cavity wherein the refractive index-matching liquid comprises a fluorinated benzene or a combination of benzene and a fluorinated benzene.

11. An optical switch according to claim 10 wherein said fluorinated benzene is benzene substituted with one or more fluoro groups attached to the ring.

12. An optical switch according to claim 10 wherein said fluorinated benzene is selected from the group consisting of fluorobenzene, difluorobenzene, trifluorobenzene, tetrafluorobenzene, pentafluorobenzene, hexafluorobenzene, fluorotoluene, difluorotoluene, trifluoromethyltoluene, tetrafluorotoluene, and pentafluorotoluene.

13. An optical switch according to claim 10 wherein said substrate comprises silica and said cavity is a groove.

14. An optical switch according to claim 10 wherein said fluorinated benzene is fluorobenzene, 1,3-difluorobenzene, 1,3,5-trifluorobenzene, hexafluorobenzene, 2-fluorotoluene, 3-fluorotoluene or 4-fluorotoluene.

* * * * *